No. 803,606. PATENTED NOV. 7, 1905.
F. A. LAW.
STEERING AXLE FOR VEHICLES.
APPLICATION FILED MAY 16, 1902.
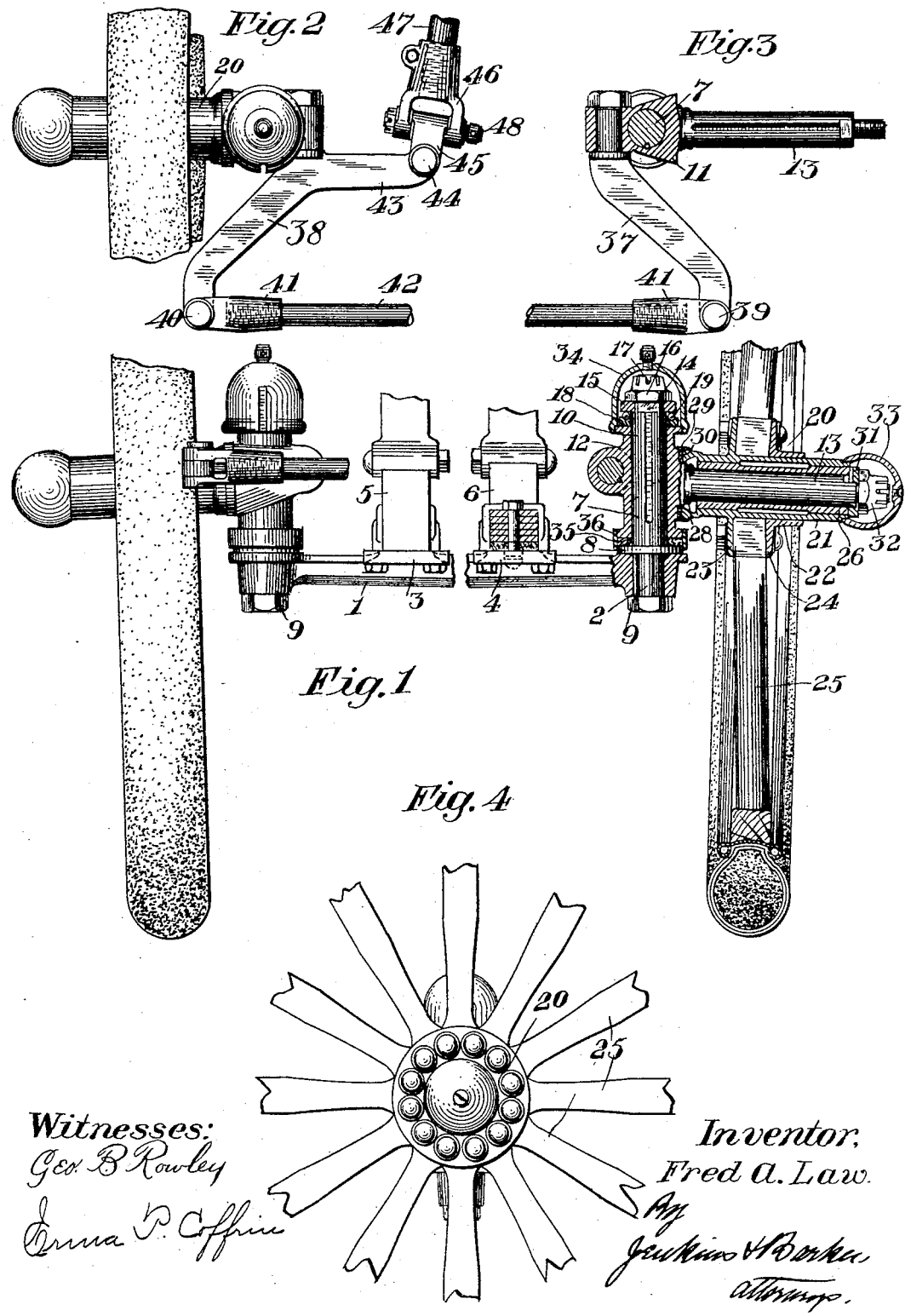

UNITED STATES PATENT OFFICE.

FRED A. LAW, OF HARTFORD, CONNECTICUT, ASSIGNOR TO ELECTRIC VEHICLE COMPANY, OF JERSEY CITY, NEW JERSEY, A CORPORATION OF NEW JERSEY.

STEERING-AXLE FOR VEHICLES.

No. 803,606.　　　Specification of Letters Patent.　　　Patented Nov. 7, 1905.

Application filed May 16, 1902. Serial No. 107,609.

*To all whom it may concern:*

Be it known that I, FRED A. LAW, a citizen of the United States, and a resident of Hartford, in the county of Hartford and State of Connecticut, have invented certain new and useful Improvements in Steering-Axles for Vehicles, of which the following is a specification.

The invention relates to steering-axles for vehicles, and more particularly to an axle of this sort in which the wheels are individually pivoted to the axle member.

The object of the invention is to provide a very strong and simple construction, and one in which the parts may be easily assembled, securing a nicety of adjustment between the parts which will preclude liability of their becoming disarranged and broken under the strains to which they are subjected.

A further object of the invention is to provide certain arrangements of the individually-pivoted wheels and their pivots by which all the parts will be thoroughly inclosed and will be provided with means for lubrication.

A further object is to provide such an arrangement of wheel-pivots as will provide a very rigid and effective bearing against certain strains, while the entire weight of the load upon the axle will be supported without causing a cramp in said bearing.

Referring to the drawings, Figure 1 is a view in front elevation of the axle member with parts broken away, the wheel-pivot and bearing at one end of the axle being cut in section. Fig. 2 is a detail plan view of one of the steering-wheels, the steering-pivot, and appurtenant parts. Fig. 3 is a detail view, in horizontal section, through the wheel-pivot. Fig. 4 is a detail side view of a portion of a wheel and pivot.

Referring to the drawings, the numeral 1 denotes the main axle member, which is preferably forged from a single piece of metal and is provided at each end with vertically-disposed sockets 2. Spring-rests 3 4 are formed integral with the main axle member 1, and upon these are mounted the springs 5 6, which form a partial spring-support for the body, which is not shown. The sockets 2 are bored to size and provided with keyways engaged by keys carried in the upright bolster or pivot 7. This bolster is provided with a shoulder 8, which rests upon a finished portion of the axle, and through the medium of a forced fit between the parts and the key and nut 9 the bolster 7 is securely fastened to the axle member 1 and is practically as closely united with it as though formed integral therewith.

Upon the upper portion 10 of the bolster-bearing 7 is arranged a wheel-supporting pivot member 11, provided with a sleeve portion 12, accurately fitting the bolster-bearing 7, and an axle-arm 13, arranged substantially at right angles to the sleeve portion 12. The upper end of the bolster is squared, as at 14, and fitting upon this squared portion is a thrust-plate 15, which is held to proper adjustment by the nut 16, threaded upon the upper end of the bolster. This nut is secured in any desired position by a cotter-pin 17. Between the thrust-plate 15 and a coöperating thrust-cone 18, borne upon the upper end of the sleeve portion 12, are a series of balls 19, providing an antifriction-bearing. A suitable oil-groove is formed in the bolster for conducting oil to all portions of said bearing. The axle-arm 13 is inclined slightly with relation to the bolster 7 to give the proper degree of set to the wheels supported thereon.

The numeral 20 denotes the wheel-hub, which comprises an inner sleeve 21 and an outer spoke-retaining sleeve 22. The inner sleeve is provided with a flange 23, which coöperates with a flange 24, formed upon the inner end of the sleeve 22, and between these two flanges the spokes 25 of the wheel are securely held.

Within the sleeve 21 there is arranged a bushing 26, preferably formed of bronze, which bears directly upon the axle-arm 13, which is ground and hardened. At or near the inner end of the hub there is an oil-recess 27, and a ridge 28, formed upon the axle and lying within this oil-recess, serves in a measure as a guard to aid in the retaining of the oil. Upon the outer end of the sleeve 21 is forced a ring 29, which overlies a finished shoulder upon the wheel-pivot and closes the joint between the wheel-pivot and the hub of the wheel. Between these two latter parts there is arranged an oil-retaining washer 30.

The outer end of the axle-arm is squared and bears a washer 31, which is held up against the bushing 26 by a nut 32, this nut being held in any desired adjustment by a cotter-pin. A cap 33, threaded upon the outer end of the hub, completely incloses the axle-arm and appurtenant parts and forms a chamber for the reception of oil, and a second cap 34, secured to the sleeve portion 12, completely incloses the upper end of the bolster-bearing and its ball-bearing. Resting upon the shoulder 8 is an oil-retaining washer 35, and a band or ring 36, secured to the bottom of the sleeve portion 12, extends over this washer and flange 8.

It will be seen from the above that all the bearing portions of the wheel, both those of the axle-bearing and the wheel-pivot bearing, are completely inclosed within a single structure, and when assembled all the bearing parts may be run in a bath of oil without liability of drip. It is also to be noted that the entire dead weight supported on the axles is borne upon the antifriction-bearing, and inasmuch as a long and very rigid bolster-bearing is provided for the pivot there is practically no tendency of cramping strains upon this ball-bearing which would exert an undue crushing effect upon the balls. By this arrangement perfect straight-line bearings are provided both for turning the wheel upon its pivot and for the wheel to turn upon—a most desirable construction. In fact, there are several advantages attained in this structure which are apparent. The axle proper may be forged with ease and the several wheel-pivot members may be easily formed and assembled. It will also be seen that springs 5 and 6, the main vehicle-springs, are pinned to the spring-attaching member, as shown, by bolts in substantially the same horizontal plane as the axis of the individually-pivoted stub-axles. On this account the strains transmitted to the vehicle are transmitted at points in substantially the same horizontal plane at which they are delivered to the whole mechanism through the wheels, either due to ordinary resistance or upon encountering obstacles, and such strains are therefore most properly accommodated.

In Figs. 2 and 3 are shown connections for moving the wheels upon their steering-pivots. Extending forwardly from each of the wheel-pivots are arms 37 38, which at their outer ends are bored to receive pins 39 40, which pass through bifurcated connecting members 41, the latter being connected by a cross-rod 42. The arm 38 has formed integral with it a projecting arm 43, which is bored at its end and connected through a pivot 44 with a link 45. This link is also pivotally connected to the bifurcated adjusting member 46. Practically a universal connection is secured between the main steering-rod 47 and the wheel-pivot arm 43. The pivot passing through the adjusting member 46 is provided with an oil-groove, and an oil-cup 48 provides a ready means for lubricating the pivotal connection.

While the device has been shown and described specifically herein, it is obvious that modifications might be made without departing from the spirit of the invention, which contemplates providing a bearing for a wheel and wheel-pivot which may be completely inclosed and run in a bath of oil and in which the dead weight will be supported upon antifriction-bearings combined with the bolster-bearings in such manner that there will be little or no liability of the antifriction-bearings becoming crushed from undue strains.

What I claim as my invention, and desire to secure by Letters Patent, is—

1. A steering mechanism comprising a main body portion, vertical pivot members separately made and fixedly secured to said main body portion by one end only and having their other end unattached, axle members mounted upon said vertical pivots and readily removable over one end thereof, means for controlling the relative positions of said last-named axle members.

2. An axle comprising a main body portion formed in a single piece, axle members pivoted thereto, pivots for said last-named axle members separately made and secured to the main axle portion projecting from the upper side thereof, said pivoted members having an unsupported upper end, and means for controlling the relative position of said pivoted axle members.

3. In combination in a steering-axle for vehicles, a main axle portion, vertical pivots secured thereto projecting entirely from the upper side, pivoted stub-axles, bearings arranged between the pivoted stub-axles and the vertical pivots, and means coöperating with the stub-axles for completely inclosing and surrounding said bearings in an oil-tight casing.

4. In a steering-axle for vehicles, a main axle member, pivoted axle members providing a wheel-bearing, a vertical pivot projecting upwardly from the main axle, and an antifriction-bearing arranged between the pivoted axle members and the upper end of the vertical pivot and adapted to bear the loads of the main axle portion.

5. In a steering-axle for vehicles, a main axle member, vertical pivots secured to said axle member, wheel-supporting axles provided with bearing portions coöperating with said pivots, antifriction thrust-bearings arranged between the pivoted axle members and the vertical pivot and unsupported in any direct way by the main axle member, means for inclosing said bearing portions, said vertical pivots secured to said axle member in manner whereby said wheel-supporting axles are removable from said pivots without disconnecting the latter from the main axle member.

6. In a steering-axle for vehicles, a main axle portion, pivoted bearings extending above said axle portion provided at their upper end with a thrust-plate independent of the main axle portion, wheel-supporting axles mounted to oscillate on said pivoted bearings, and provided with thrust-cones coöperating with thrust-plates upon the pivots, means for adjusting the thrust-bearing and means for completely inclosing the thrust and pivot bearings.

7. In combination with an axle member provided with pivot-bearings, wheel-supporting axles mounted upon the pivot-bearings, thrust-bearings adapted to suspend the load intermediate of the main axle and the wheel-supporting axle members, and a wheel-hub surrounding the axle-supporting pivot and provided with caps inclosing the wheel-bearings and caps for inclosing the thrust and pivot bearings.

8. In combination with a main axle, a separately-fashioned and rigidly-attached pivot projecting upwardly therefrom, a stub-axle encircling said pivot and carried thereon by a plain bearing, an antifriction-bearing at the upper end of said pivot remote from the point of attachment of said pivot to the main axle member, a collar and locking means for the upper end of said pivot coöperating with said antifriction-bearing.

9. In combination with a main axle member, separate pivots upwardly projecting and fixedly attached at the extremities thereof, stub-axles on said pivots, spring-seats on the main axle and springs attached to said seats and at their extremities attached to a portion of the superimposed vehicle, said point of attachment and said stub-axle centers lying substantially in the same horizontal plane, as and for the purpose described.

10. In an axle construction for vehicles, a main axle member extending from side to side of the vehicle, stub-axles pivoted at the ends of said main axle member, springs attached to said main axle member and to a portion of a superimposed body or frame, said latter point of attachment and axis of the stub-axles being in substantially the same horizontal plane.

11. In combination in a steering-axle for vehicles a substantially vertical pivot extending freely upward from the main axle portion and fixedly attached at one end only, a stub-axle adapted to carry a road-wheel and having a hub mounted to oscillate on said vertical pivot, a removable shoulder or collar secured wholly by said pivot and not supported by the main axle, a casing attached to said stub-axle hub and completely inclosing the upper end of said pivot.

12. In combination in a steering-axle for vehicles, a main axle or supporting member, a substantially vertical pivot, a secondary or oscillating stub-axle comprising axle end and hub portion, said hub having a close-fitting bearing upon said pivot permitting oscillation, means for preventing movement of said stub-axle longitudinally of said pivot, said pivot and support coöperating whereby the pivot is rigidly held in a substantially vertical position without additional brace or securing means.

FRED A. LAW.

Witnesses:
   Wm. H. Barker,
   E. P. Coffrin.